United States Patent
Ono et al.

(10) Patent No.: US 8,741,436 B2
(45) Date of Patent: Jun. 3, 2014

(54) WINDOW GLASS WITH CONDUCTIVE CERAMIC FIRED BODY

(75) Inventors: Kazuhisa Ono, Tokyo (JP); Yota Yano, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 854 days.

(21) Appl. No.: 12/867,362

(22) PCT Filed: Feb. 9, 2009

(86) PCT No.: PCT/JP2009/052167
§ 371 (c)(1),
(2), (4) Date: Nov. 3, 2010

(87) PCT Pub. No.: WO2009/101919
PCT Pub. Date: Aug. 20, 2009

(65) Prior Publication Data
US 2011/0039113 A1    Feb. 17, 2011

(30) Foreign Application Priority Data
Feb. 13, 2008 (JP) ................. 2008-032448

(51) Int. Cl.
*B32B 17/06* (2006.01)
*B32B 15/04* (2006.01)

(52) U.S. Cl.
USPC ........... 428/432; 428/428; 428/688; 428/689; 428/701; 428/702

(58) Field of Classification Search
USPC .......... 428/428, 432, 701, 702, 688, 689, 699
See application file for complete search history.

(56) References Cited

U.S. PATENT DOCUMENTS

| | | | |
|---|---|---|---|
| 4,959,270 | A | 9/1990 | Hasegawa |
| 5,189,952 | A | 3/1993 | Ohmura et al. |
| 2005/0153143 | A1 | 7/2005 | Minowa et al. |
| 2007/0243392 | A1 | 10/2007 | Yamada et al. |

FOREIGN PATENT DOCUMENTS

| | | |
|---|---|---|
| EP | 1 698 454 | 9/2006 |
| JP | 63-314789 | 12/1988 |
| JP | 4-4030 | 1/1992 |
| JP | 04-087182 | 3/1992 |

(Continued)

OTHER PUBLICATIONS

Communication mailed Oct. 1 2012, in connection with European Patent Application No. 09710326.1, 6 pages; European Patent Office, Dusseldorf, Germany.

(Continued)

*Primary Examiner* — David Sample
*Assistant Examiner* — Lauren Colgan
(74) *Attorney, Agent, or Firm* — Antonelli, Terry, Stout & Kraus, LLP.

(57) ABSTRACT

A window glass with a conductive ceramic fired body includes at least one glass plate having main surfaces, and the conductive ceramic fired body including a feeding point and a linear portion which is disposed on either one of the main surfaces of the glass plate, at least a part of the linear portion being placed in a visible region of the window glass and formed by successively laminating a first colored layer, a conductor layer and a second colored layer on the main surface, wherein the first colored layer and the second colored layer each include a pigment and a glass component, and the conductor layer includes silver and the glass component.

19 Claims, 7 Drawing Sheets

(i)

(ii)

(56) References Cited

FOREIGN PATENT DOCUMENTS

| | | |
|---|---|---|
| JP | 7-44954 | 12/1995 |
| JP | 2007-284276 | 11/2007 |
| WO | WO 2005/068385 | 7/2005 |

OTHER PUBLICATIONS

Communication mailed Aug. 24, 2012, in connection with Chinese Patent Application No. 200980104929.6, 7 pages, Chinese Patent Office, Republic of China.

Japanese Official Action issued on Nov. 8, 2011 in connection with Application No. 2009-553412.

INTERIOR SIDE OF VEHICLE

Fig.6

INTERIOR SIDE OF VEHICLE

WINDOW GLASS WITH CONDUCTIVE CERAMIC FIRED BODY

TECHNICAL FIELD

The present invention relates to a window glass with conductive ceramic fired body.

BACKGROUND ART

Some kinds of window glasses are provided on at least one of their main surfaces (hereinafter occasionally referred to as a "print surface") with a conductive ceramic fired body as a conductor in order to form antenna wires for receiving a variety of radio waves used in the applications such as digital broadcasting, televisions, radios, GPS and keyless entry systems, defoggers (hot wires), circuit wirings, etc. The window glasses of such a type are attached to vehicles, in particular, automobiles, and used therein as a front window, a rear window or a side window.

The conductive ceramic fired body is generally produced on a surface of the window glass by screen-printing a given pattern of a conductive ceramic paste containing silver and a glass component on the print surface of the window glass and subjecting the thus printed pattern of the conductive ceramic paste to heat treatment for calcining the paste. The thus produced conductive ceramic fired body exhibits a white color when viewed from a front side of the window glass having the print surface and a brown color when viewed from a rear side of the window glass opposite to the print surface. For this reason, in the case of window glasses having a deep color such as black which may be frequently used for vehicles, the portion of the window glass where the conductive ceramic fired body is formed tends to offend the eyes when viewed from an interior side of the vehicle, and tends to adversely affect an exterior design of the vehicle to a considerable extent when viewed from an exterior side of the vehicle, resulting in poor appearance thereof on both of the interior and exterior sides of the vehicle.

Incidentally, when the conductive ceramic fired body serving especially as antenna wires is formed in a vehicle, from the viewpoint of reducing its adverse influence on a vehicle body as one of conductive parts of the vehicle to ensure a good performance thereof, it is preferred that the conductive ceramic fired body be installed at a position as distant as possible apart from a flange portion (of the vehicle body) to which the window glass is mounted. In consequence, the conductive ceramic fired body must be installed in a visible region of the window glass which is remarkably noticeable by passengers, thereby causing such a tendency toward a poor appearance of an interior side of the vehicle.

To solve the above problems, Patent Document 1 discloses the invention concerning a window glass for vehicles in which the psychometric lightness L* value of a color of the antenna wires constituted of a fired body of a conductive paste when viewed from each of an interior side and an exterior side of the vehicle is limited to a predetermined value by adding a pigment or a color-developing agent to the conductive paste. Patent Document 2 discloses the invention concerning a film antenna formed by successively laminating a black-colored opaque adhesive, a resin film formed of polyethylene terephthalate, etc., an antenna element and a black-colored portion on a surface of a glass plate. In addition, Patent Document 3 discloses the invention concerning a conductive fired body having a surface layer in which a large amount of silver chloride is incorporated by subjecting the fired body to chemical treatment.

Patent Document 1: JP-A 2001-206056
Patent Document 2: JP 4021911
Patent Document 3: JP-A 2007-284276

EXPLANATION OF REFERENCE NUMERALS

1: Window glass with conductive ceramic fired body; 2, 2A, 2B, 12: Glass plates; 3, 13: Linear portion; 4A: First colored layer; 4B: Second colored layer; 5: Conductor layer; 6, 16: Feeding point; 7: First light shielding film; 7A: Strip-like region; 7B: Dotted pattern region; 8: Second light shielding film; 9: Intermediate film; 10: Conductive ceramic fired body; 13a, 13b: Resistance measuring points; 14: Measuring portion; 20: Visible region

DISCLOSURE OF THE INVENTION

Problems to be Solved by the Invention

However, in the window glass for vehicles as disclosed in Patent Document 1, the antenna wire has a psychometric lightness L* value of its color which lies in the range of from 50 to 70 and, therefore, fails to exhibit a sufficiently low lightness. As a result, since the antenna wire becomes noticeable whitely, it is not possible to suppress deterioration in appearance of an interior side of the vehicle to a sufficient extent. In addition, in Patent Document 1, since the content of silver in the conductive paste is decreased by adding the pigment or color-developing agent into the conductive paste, the resulting conductive fired body has an increased resistance value, thereby causing such a problem that the fired body tends to be deteriorated in conductivity. The film antenna disclosed in Patent Document 2 tends to suffer from poor appearance owing to glittering of the resin film although an appearance of the antenna when viewed from both an interior side and an exterior side of the vehicles is usually good. Further, the film antenna disclosed in Patent Document 2 also tends to have the problems such as poor scratching strength owing to its laminated structure in which the resin film and the glass plate are bonded to each other through the adhesive layer. Also, the window glass disclosed in Patent Document 3 still has such a problem that an appearance of the window glass when viewed from an exterior side of the vehicle is poor and must be therefore improved, although the appearance when viewed from an interior side of the vehicles is good.

In view of the above problems, an object of the present invention is to provide a window glass with conductive ceramic fired body which is capable of not only ensuring a good conductivity of the fired body but also exhibiting an improved appearance on both an interior side and an exterior side of the vehicle when the window glass is used for vehicles.

Means for Solving the Problems

As a result of intensive researches for achieving the above object, the present inventors have found that the above problems can be solved by such a structure in which a conductor layer containing silver and a glass component is sandwiched between colored layers containing a pigment. The present invention has been accomplished by the above finding.

That is, according to the present invention, there is provided a window glass with conductive ceramic fired body, including at least one glass plate having main surfaces, and the conductive ceramic fired body including a feeding point and a linear portion which is disposed on either one of the main surfaces of the glass plate, at least a part of the linear portion being placed in a visible region of the window glass and formed by successively laminating a first colored layer, a conductor layer and a second colored layer on the main surface, wherein the first colored layer and the second colored layer each include a pigment and a glass component, and the conductor layer includes silver and the glass component.

Effect of the Invention

In accordance with the present invention, it is possible to obtain a window glass with conductive ceramic fired body which is capable of not only ensuring a good conductivity of the fired body but also exhibiting an improved appearance on both an interior side and an exterior side of the vehicle when the window glass is used for vehicles.

BEST MODE FOR CARRYING OUT THE INVENTION

The preferred embodiments of the present invention are described below by referring to the accompanying drawings.
[Conductive Ceramic Fired Body]

Figure 1:
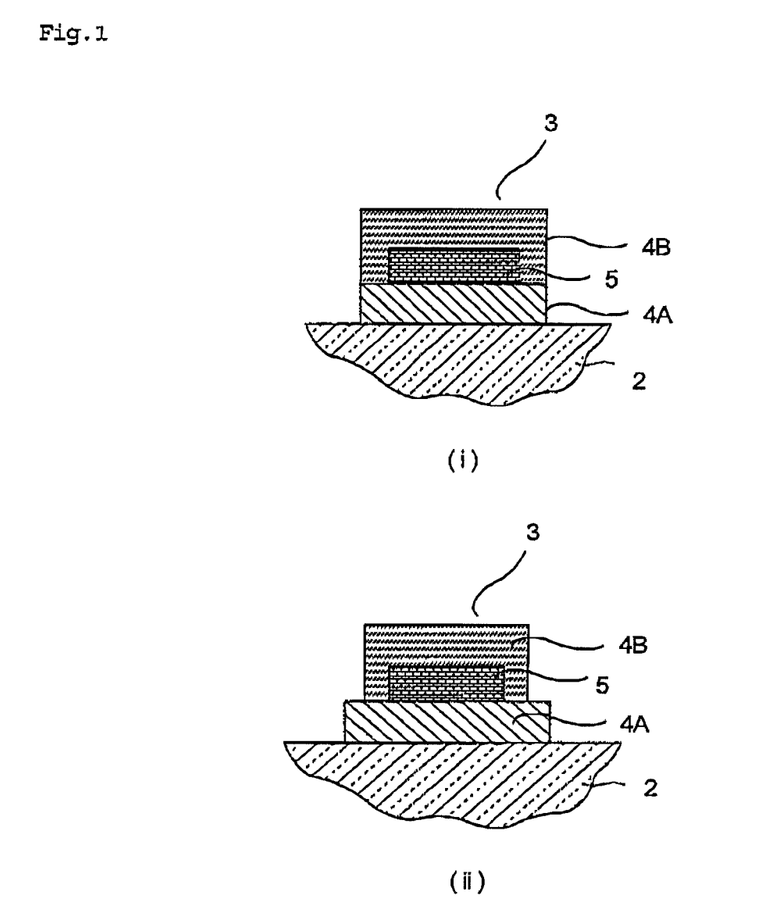
FIGS. 1 are sectional views of a window glass with conductive ceramic fired body according to the present invention.
Figure 2:
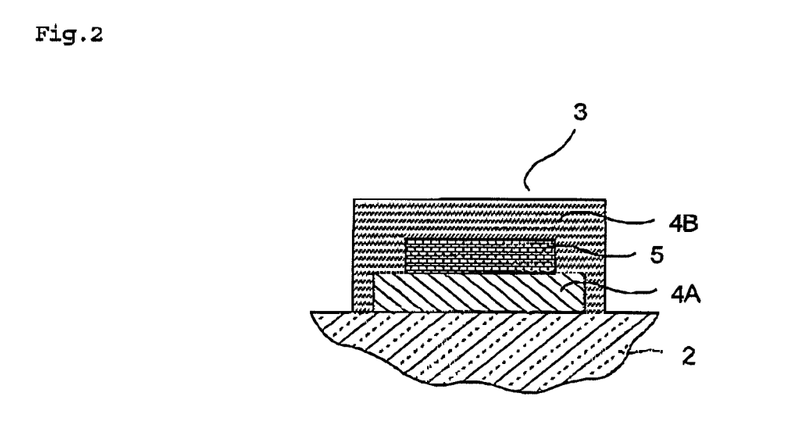
FIG. 2 is a sectional view of a window glass with conductive ceramic fired body according to the present invention.
Figure 3:
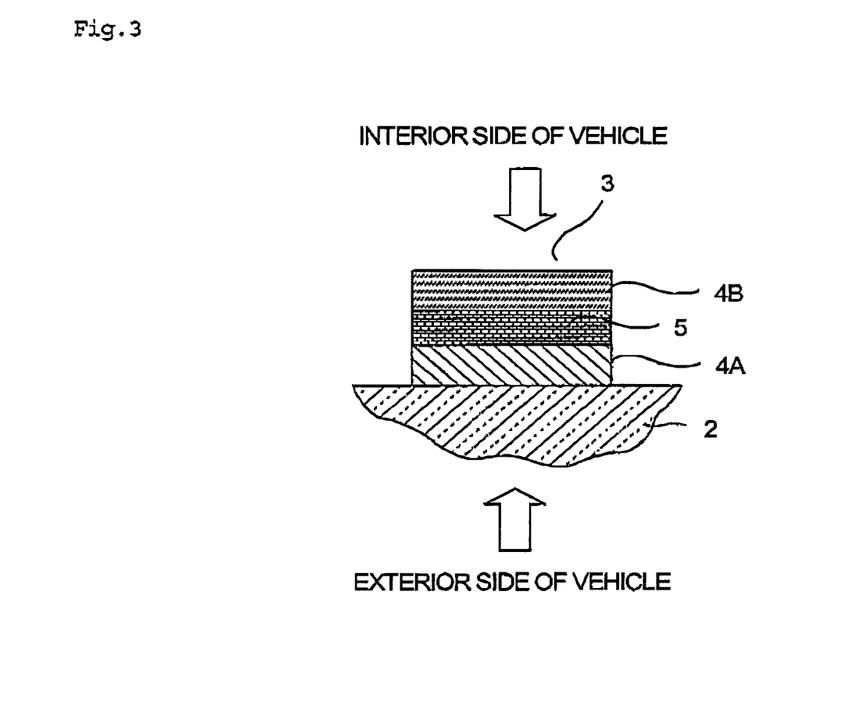
FIG. 3 is a sectional view of a window glass for vehicles with conductive ceramic fired body according to the present invention.

First, the window glass with conductive ceramic fired body according to the present invention is explained by referring to FIGS. 1 to 3. The conductive ceramic fired body includes a linear portion 3 which is formed by successively laminating a first colored layer, a conductor layer and a second colored layer on a main surface of a glass plate 2 in at least a part of a visible region 20 thereof, and a feeding point 6 which is preferably formed by successively laminating a first colored layer and a conductor layer on the main surface of the glass plate.

FIGS. 1 and 2 each show an example of respective preferred embodiments of the window glass with conductive ceramic fired body. In FIGS. 1 and 2, there is shown the linear portion 3 which is formed by successively laminating a first colored layer 4A, a conductor layer 5 and a second colored layer 4B on the main surface of the glass plate (hereinafter occasionally referred to as a "print surface").

The conductor layer 5 is preferably produced by applying a conductive ceramic paste by screen-printing, etc., and then calcining the thus applied paste. The conductive ceramic paste contains silver particles having an average particle size of from 0.1 to 15.0 μm and a glass binder such as bismuth borosilicate and zinc borosilicate (crystallized glass and amorphous glass) as essential components. The conductive ceramic paste may also contain, in addition to these essential components, optional components such as a transition metal oxide including an oxide of at least one element selected from the group consisting of vanadium, manganese, iron and cobalt; a resin such as ethyl cellulose and rosin-based resins; and an additive such as alumina, if required. The conductive ceramic paste may be in the form of a dispersion prepared by dispersing the above essential and optional components in an organic medium such as terpineol and dibutyl carbitol.

The contents of the respective components in the conductive ceramic paste are preferably adjusted such that the content of the silver particles therein is from 70 to 80% by mass; the contents of the glass binder and the transition metal oxide therein are each from 1 to 10% by mass; the content of the resin therein is from 1 to 10% by mass; the content of the additive therein is from 1 to 10% by mass; and the content of the organic medium therein is from 10 to 20% by mass. When the contents of the respective components in the conductive ceramic paste lie within the above-specified ranges, the obtained conductive ceramic paste is excellent in printability, so that the resulting conductive ceramic fired body can exhibit a sufficient performance.

The first colored layer 4A and the second colored layer 4B are respectively preferably formed by applying a colored ceramic paste by screen-printing, etc., and then calcining the thus applied paste. The colored ceramic paste contains a pigment such as copper oxide, chromium oxide, iron oxide and manganese oxide, and the same glass binder as used in the above conductive ceramic paste, as essential components. The colored ceramic paste may further contain a resin such as ethyl cellulose and an organic solvent such as pine oil, if required.

The glass binder contained in the colored ceramic paste serves for improving adhesion to the glass plate when used in the first colored layer 4A, and forming a strong coating film when used in the second colored layer 4B to thereby enhance a durability of the resulting layer. The contents of the respective components in the colored ceramic paste are preferably adjusted such that the content of the pigment therein is from 10 to 35% by mass, the content of the glass binder therein is from 50 to 70% by mass, the content of the resin therein is from 5 to 20% by mass, and the content of the organic solvent therein is from 5 to 30% by mass.

The pigment preferably contains at least one oxide selected from the group consisting of copper oxide, chromium oxide, iron oxide and manganese oxide. These oxide may be used singly or in the form of a mixture of any two or more thereof. Alternatively, these oxide may also be used in the form of a mixture with the other pigments. When the contents of the respective components in the colored ceramic paste lie within the above-specified ranges, the resulting colored ceramic paste can exhibit a sufficient color-developing property as well as an excellent printability. The colored ceramic pastes used for forming the first colored layer 4A and the second colored layer 4B may be the same or different from each other.

At least a part of the linear portion 3 is formed in a visible region 20 of the window glass. It is required that the part of the linear portion 3 which is formed in the visible region 20 has the first colored layer, the conductor layer and the second colored layer. The other portions of the linear portion 3 which are formed outside of the visible region 20 are also preferably constituted of the first colored layer, the conductor layer and the second colored layer similarly to the portion formed in the visible region 20.

In the linear portion 20, the line width of the conductor layer 5 may be the same as those of the first colored layer 4A and the second colored layer 4B as shown in FIG. 3. However, as shown in FIGS. 1 and 2, the line width of the conductor layer 5 is preferably narrower than those of the first colored layer 4A and the second colored layer 4B, for example, narrower by from about 0.02 to about 0.2 mm than those of the first colored layer 4A and the second colored layer 4B. More specifically, the conductive ceramic fired body formed by successively laminating the first colored layer 4A, the conductor layer 5 and the second colored layer 4B according to the present invention may be configured such that the conductor layer is covered with the first colored layer and the second colored layer, and the first and second colored layers are integrated with each other. For example, as the preferred configuration of the conductive ceramic fired body, there may be mentioned the configuration as shown in FIGS. 1(i) and 1(ii) in which the conductor layer 5 is covered with the second colored layer 4B, and the line width of the first colored layer 4A is not smaller than that of the second colored layer 4B, or the configuration as shown in FIG. 2 in which the first colored layer 4A and the conductor layer 5 are covered with the second colored layer 4B. When the line widths of the respective layers are adjusted as described above, the conductor layer 5 can be completely covered with the first colored layer 4A and the second colored layer 4B. In consequence, it is possible to prevent the conductor layer 5 from being deteriorated and further from being directly viewed from either an interior side or an exterior side of the vehicle, resulting in good appearance of the window glass. In addition, since the conductor layer 5 can be prevented from projecting from the respective colored layers in the course of forming the conductor layer 5 by applying the conductive ceramic paste, the resulting conductive ceramic fired body can exhibit a good appearance.

The line width of the linear portion 3 formed from these layers may be appropriately determined according to the aimed applications of the conductive ceramic fired body, and is preferably 1.0 mm or less, more preferably 0.5 mm or less and still more preferably from 0.3 to 0.5 mm. When the line width of the linear portion 3 lies within the above specified range, the resulting conductive ceramic fired body can exhibit a sufficient performance, and the resulting window glass can have a good appearance on both the print surface and rear surface thereof. More specifically, when the conductive ceramic fired body is provided on the window glass for vehicles, an appearance of the window glass as viewed from either an interior side or an exterior side of the vehicle can be improved. The line widths of respective parts of the linear portion 3 may be the same or different, and the line width of a part of the linear portion 3 may be broader than those of the other parts thereof, if required.

The thickness of the conductor layer 5 may be appropriately determined in view of the line width and specific resistance value thereof such that the resulting conductive ceramic fired body can exhibit a given performance, and is preferably in the range of from 3 to 20 μm. The thickness of each of the first colored layer 4A and the second colored layer 4B is not particularly limited unless the conductive layer is seen therethrough, and may be adjusted, for example, in the range of from about 3 to about 25 μm.

The size of the feeding point 6 may be appropriately determined according to the method used for connecting it with an external circuit. The relationship between sizes (relationship between widths) of the first colored layer 4A and the conductor layer 5 forming the feeding point 6 as well as the thicknesses of these layers may be the same as those of the first colored layer 4A and the conductor layer 5 used for forming the above linear portion 3. In particular, the width of the first colored layer 4A forming the feeding point 6 is preferably larger than that of the conductor layer 5 forming the feeding point 6 because the conductor layer 5 is prevented from projecting from the first colored layer 4A which results in production of a good feeding point 6.

In the conductive ceramic fired body having the above structure, the linear portion preferably has a psychometric lightness $L^*$ value in CIE 1976 $L^*a^*b^*$ color system of 50 or less, more preferably 30 or less and still more preferably 15 or less. More specifically, when viewed from either an interior side or an exterior side of the vehicle, the conductive ceramic fired body whose lightness $L^*$ value lies within the above specified range exhibits a dark color, so that the portion of the window glass where the conductive ceramic fired body is provided becomes unnoticeable, resulting in a good appearance of the window glass. Incidentally, when the linear portion of the conductive ceramic fired body has a psychometric lightness $L^*$ value of more than 50, the conductive ceramic fired body tends to exhibit a white color and, therefore, become noticeable.

The linear portion preferably has a color coordinate $a^*$ value in the $L^*a^*b^*$ color system of from −20 to 20, more preferably from −5 to 5 and still more preferably from 0 to 5. In addition, the linear portion preferably has a color coordinate $b^*$ value in the $L^*a^*b^*$ color system of from −20 to 20, more preferably from −5 to 5 and still more preferably from −2 to 3. The color tone of the conductive ceramic fired body may be desirably adjusted by varying the content of the pigment in the colored ceramic paste, and is preferably adjusted such that the resulting conductive ceramic fired body exhibits a black-based color.

The "$L^*$ value", "$a^*$ value" and "$b^*$ value" as used herein mean those prescribed in the color specification method according to JIS Z8729-2004, and may be measured, for example, by using a spectrophotometric colorimeter "CM-3500d (Model No.)" available from Konica-Minolta Holdings Corp., etc.

The conductor layer of the conductive ceramic fired body preferably has a specific resistance of from 1 to 12 μΩcm, and more preferably from 1 to 6 μΩcm. Thus, the conductive ceramic fired body of the present invention can exhibit an excellent conductivity.

The specific resistance $\rho$ (μΩcm) as used herein is the value obtained in the following manner. That is, a predetermined length d (cm; e.g., d=100 cm) of the conductive ceramic fired body having the same line width over a whole portion thereof is subjected to measurement of a resistance value R (μΩ) thereof using a digital multi-meter. Then, a film sectional area S (cm$^2$) of the conductive ceramic fired body is measured by a contact-type surface profiler "P-10" (Model No.) available from KLA Tencor Corp. Using the predetermined length d as well as the resistance value R and the film sectional area S thus measured, the specific resistance $\rho$ of the conductive ceramic fired body is calculated from the formula: $\rho = RS/d$.

[Method for Producing Window Glass with Conductive Ceramic Fired Body]

The method for producing the window glass with conductive ceramic fired body is explained below with respect to the method in which the conductive ceramic fired body is directly printed and formed on the glass plate, as a preferred example thereof.

First, the colored ceramic paste is screen-printed into a predetermined pattern on the surface of the glass plate 2 facing an interior side of the vehicle, and then dried in a drying oven. Next, the conductive ceramic paste is screen-printed on the thus printed colored ceramic paste, and then dried in a drying oven. In the case where the linear portion 3 is formed, the colored ceramic paste is further screen-printed on the thus printed conductive ceramic paste, and then dried in a drying oven. The glass plate 2 used in the above method may be an ordinary float sheet glass having a pour point of 850° C. The screen-printing may be carried out by using a polyester screen having a size of from about 300 to about 400 mesh. The drying may be carried out at a temperature of 150° C. for about 10 min.

When printing the conductive ceramic paste on the colored ceramic paste, the conductive ceramic paste is preferably applied so as not to project from the colored ceramic paste. This is because the conductor layer 5 is preferably completely covered with the first colored layer 4A and the second colored layer 4B. For this reason, it is preferred that the line width of the colored ceramic paste applied onto the surface of the glass plate 2 be broader than the desirable line width of the conductor layer, although the line widths of both the layers may be identical to each other. For example, the line width of the colored ceramic paste applied onto the surface of the glass plate 2 is preferably broader by from about 0.02 to about 0.2 mm than that of the conductor layer.

Also, when printing the colored ceramic paste on the thus printed conductive ceramic paste, although the line width of the colored ceramic paste printed may be the same as that of the conductive ceramic paste previously printed, it is preferred that the colored ceramic paste be printed so as to completely cover the conductive ceramic paste. For example, the line width of the colored ceramic paste printed is preferably broader by from about 0.02 to about 0.2 mm than that of the conductive ceramic paste previously printed. Meanwhile, in the portion forming the feeding point 6, no colored ceramic paste is printed on the conductive ceramic paste.

Next, the glass plate on which the colored ceramic paste, the conductive ceramic paste and the colored ceramic paste are successively printed is heat-treated at a calcination temperature of from 580 to 700° C. for 1 to 20 min for calcining the pastes to thereby produce the conductive ceramic fired body 10 on the glass plate. In the case where the window glass is used for vehicles, the calcination of these pastes may be usually carried out simultaneously with bending of the glass plate and, if required, with a reinforcing treatment of the glass plate.

Upon the calcination, organic substances contained in the conductive ceramic paste and the colored ceramic paste are volatilized or burned out. The glass binder contained in each of the ceramic pastes has a pour point of from 300 to 700° C. The respective layers thus fluidized or melted by the calcination are then strongly bonded to each other. The glass plate having a pour point of 850° C. or higher are still kept in a non-fluidized state even upon the calcination but softened to such an extent as to undergo bending, so that the conductive ceramic fired body can be strongly bonded to the glass plate.

The window glass with conductive ceramic fired body according to the present invention may also be produced by transferring a conductive pattern layer formed in a transfer film onto the main surface of the glass plate through an adhesive layer and then calcining the thus transferred layer. As the transfer film, there may be mentioned a transfer-type antenna as described, for example, in JP-A 2006-42240. In general, the transfer film is formed by successively laminating an adhesive pattern layer (release layer), a conductive pattern layer and a protective pattern layer (adhesive layer) which may be further covered, if required, with a protective film, on a flexible release film made of a resin such as polyethylene terephthalate (PET). The structure of the conductive pattern layer may be appropriately determined according to the aimed applications thereof. The conductive pattern layer which is to be used for production of the window glass with conductive ceramic fired body according to the present invention may be in the form of a non-calcined laminate prepared by successively laminating the second colored layer, the conductor layer and the first colored layer on a base film.

The thus obtained conductive ceramic fired body can be applied to antenna wires for receiving a variety of radio waves used in the applications such as digital broadcasting, televisions, radios, GPS and keyless entry systems, defoggers (hot wires), circuit wirings, etc.

[Window Glass for Vehicles with Conductive Ceramic Fired Body]

In the followings, the window glass with conductive ceramic fired body according to the present invention is explained by referring to an embodiment in which the window glass is applied to vehicles.

Figure 4:
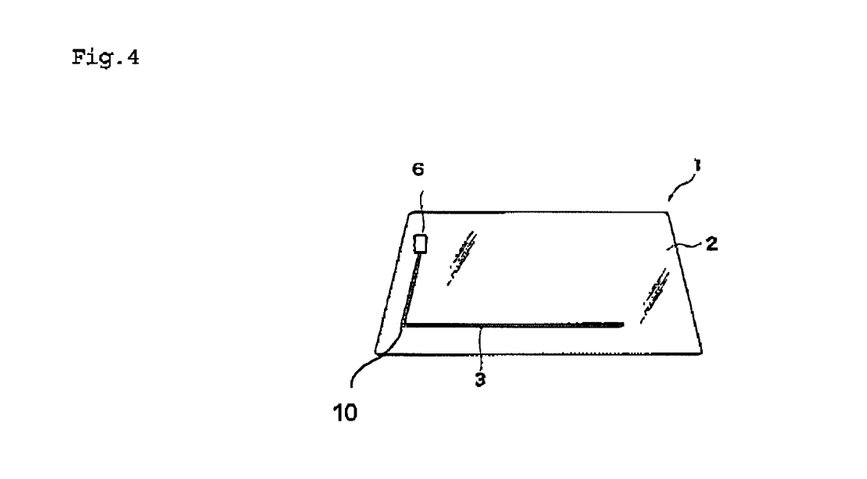
FIG. 4 is a sectional view of a window glass for vehicles with conductive ceramic fired body according to the present invention.

FIG. 4 shows a concept of the window glass with conductive ceramic fired body according to the present invention which is used as a window glass for vehicles. The window glass 1 with conductive ceramic fired body according to the present invention includes a glass plate 2 and a conductive ceramic fired body 10 formed on a surface of the glass plate 2 facing an interior side of a vehicle. The conductive ceramic fired body 10 includes a linear portion 3 and a feeding point 6 coupled with a feeding terminal. At least a part of the linear portion 3 is disposed in a visible region 20 of the window glass. The line width and thickness of the linear portion 3 may be appropriately determined according to the aimed applications of the conductive ceramic fired body.

Also, the window glass with conductive ceramic fired body according to the present invention may be formed into various structures including (i) a laminated glass composed of two glass plates, (ii) a light-shielding window glass having a light-shielding film, or the like. The preferred embodiments of the window glass with conductive ceramic fired body according to the present invention which is used as a window glass for vehicles are explained by referring to FIGS. 5 to 9.

Figure 5:
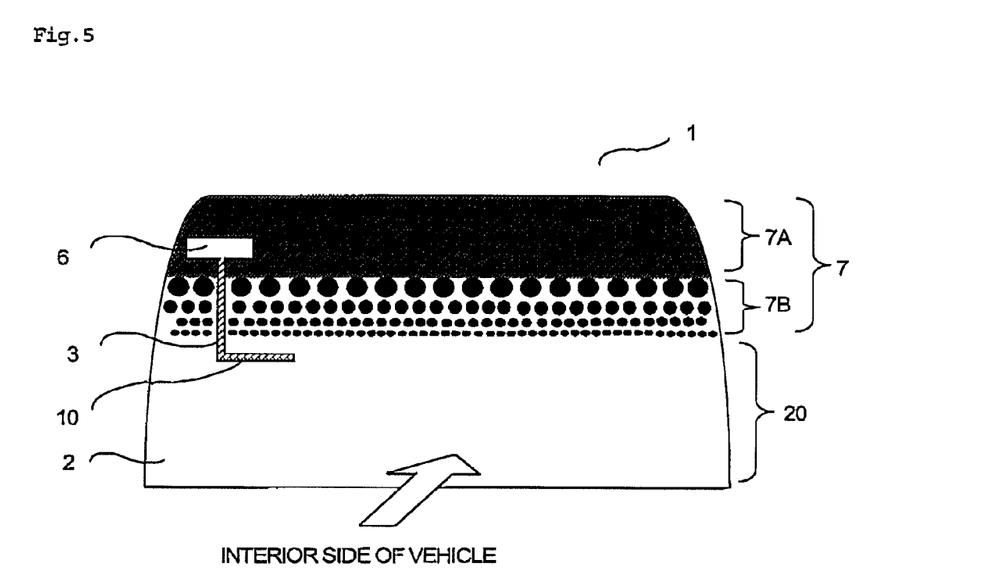
FIG. 5 is a front view of a preferred embodiment of a window glass for vehicles with conductive ceramic fired body according to the present invention.
Figure 6:
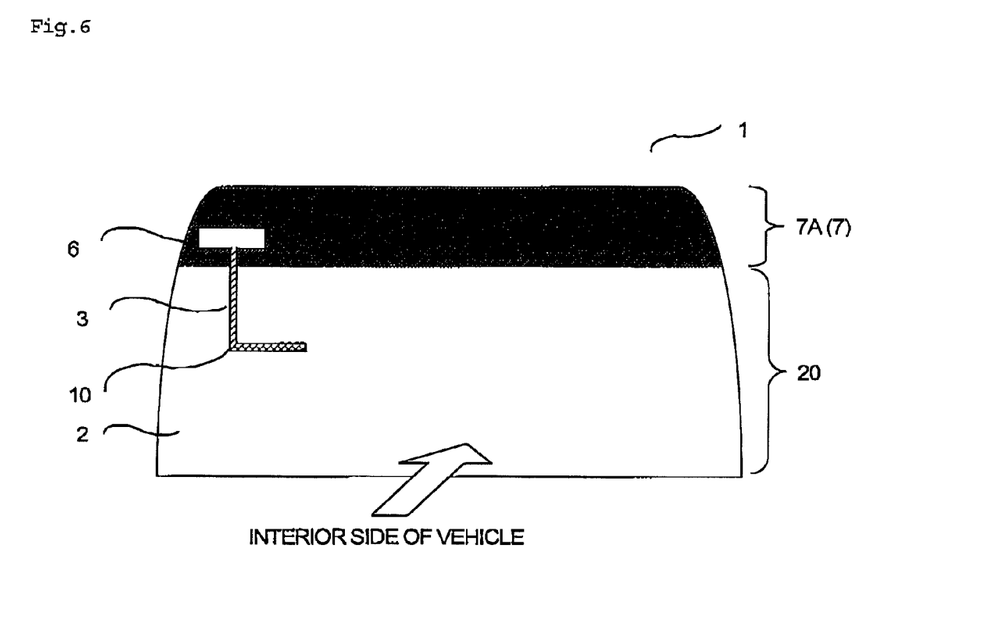
FIG. 6 is a front view of a preferred embodiment of a window glass for vehicles with conductive ceramic fired body according to the present invention.

[Embodiments of FIGS. 5 and 6]

The window glasses 1 with conductive ceramic fired body as shown in FIGS. 5 and 6 each have the conductive ceramic fired body 10 and a first light-shielding film 7 for shielding substantially a whole of incident light on the surface of the glass plate 2 facing an interior side of the vehicle. The visible region 20 of the window glass 1 with conductive ceramic fired body which is applied to vehicles is a transparent portion of the glass plate where no light-shielding film 7 is provided, and may also include a translucent portion thereof provided in an upper portion of the windshield, if required. The conductive ceramic fired body 10 includes the feeding point 6 formed in the first light-shielding film 7, and the linear portion 3 formed in the first light-shielding film 7 and the visible region 20. That is, at least a par of the linear portion 3 is disposed in the visible region 20.

The first light-shielding film 7 is not particularly limited as long as it has a light-shielding function. As the light-shielding film 7, there is preferably used, for example, the film as described in PCT Pamphlet WO 2007/052600 which has a deep color such as black or gray, and is arranged along at least a part of a peripheral portion of the glass plate 2 and provided with a strip-like region 7A disposed on an outer side of the peripheral portion and a dotted pattern region 7B having a plurality of dots which is disposed inside of the strip-like region 7A. The light-shielding film 7 may have the strip-like region 7A solely as shown in FIG. 6. The light-shielding film 7 may be formed by subjecting the film and the conductive ceramic fired body 10 to calcination at the same time. The calcination may be usually conducted simultaneously with bending of the glass plate and, if required, with a reinforcing treatment thereof. Meanwhile, in FIGS. 5 and 6, although the upper portion of the glass plate 2 is shown in exaggeration, the light-shielding film 7 is generally formed along an entire periphery of the glass plate 2.

In order to attain a stronger adhesion between the linear portion 3 and the glass plate 2 and ensure a good strength of the linear portion 3, the conductive ceramic fired body 10 is preferably disposed so as not to overlap with respective dots of the dotted pattern region 7B as shown in FIG. 5, or a portion of the linear portion 3 which is overlapped with the dots preferably has a line width larger by about 0.2 to about 0.5 mm than a line width of the other portion thereof. The reason therefor is that when the linear portion 3 is formed across the dots, non-contact portions between the linear portion 3 and the glass plate might be caused depending upon the thickness of the respective dots. In addition, the conductive ceramic fired body 10 may also be provided so as to overlap with the first light-shielding film 7. In this case, the first light-shielding film 7 is present between the glass plate 2 and the first colored layer 4A. However, it should be noted that such an embodiment is also involved in the scope of the present invention, because the first light-shielding film 7 is generally formed from the same colored ceramic paste as used for production of the colored layer in the present invention. Incidentally, in the embodiments shown in FIGS. 5 and 6, the glass plate may be in the form of a laminated glass.

Figure 7:
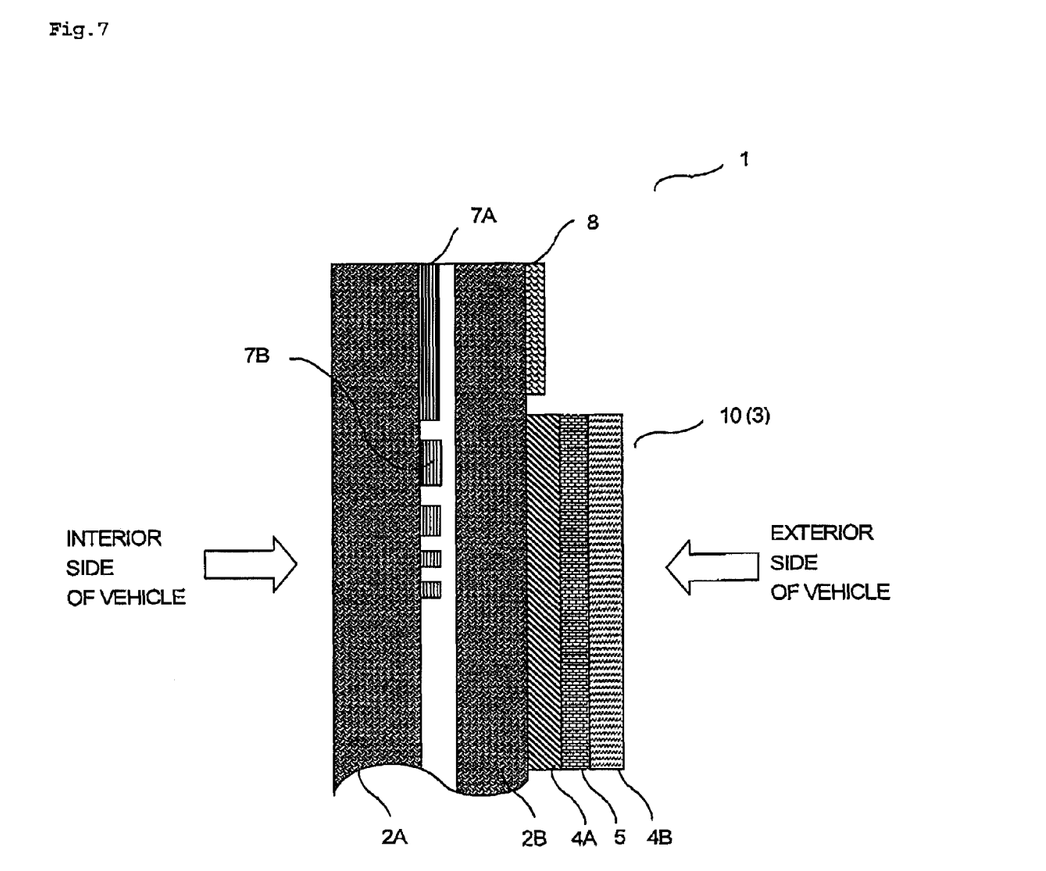
FIG. 7 is a sectional view of a preferred embodiment of a window glass for vehicles with conductive ceramic fired body according to the present invention.

[Embodiment of FIG. 7]

FIG. 7 is a vertical sectional view of a portion of the window glass 1 with conductive ceramic fired body where the linear portion 3 is formed. In the window glass 1 with conductive ceramic fired body as shown in FIG. 7, the glass plate 2 is in the form of a laminated glass including a glass plate 2A and a glass plate 2B which are bonded to each other through an intermediate film 9. The conductive ceramic fired body 10 is provided on an interior side surface of the glass plate 2B disposed on an interior side of the vehicle, whereas the first light-shielding film 7 having the strip-like region 7A and the dotted pattern region 7B is provided on an interior side surface of the glass plate 2A disposed on an exterior side of the vehicle.

In the above embodiment, the conductive ceramic fired body 10 may be provided on an interior side surface of the glass plate 2A, and the first light-shielding film 7 may be provided on either an interior side surface or an exterior side surface of the glass plate 2B. Further, on the interior side surface of the glass plate 2B, there is preferably provided a second light-shielding film 8 having the same heat absorption capability as that of the strip-like region 7A provided on the glass plate 2A. With the arrangement of the second light-shielding film 8, it is possible to equalize a stress applied to the glass plate 2A with that applied to the glass plate 2B, thereby facilitating production of a window glass for vehicles having more excellent properties.

In view of the above purposes, the installation positions of the strip-like region 7A and the second light-shielding film 8 are not particularly limited to those shown in FIG. 7 in which the strip-like region 7A and the second light-shielding film 8 are disposed on an interior side surface of the glass plate 2A and an interior side surface of the glass plate 2B, respectively. The second light-shielding film 8 may also be disposed at the similar position on the glass plate other than the glass plate on which the strip-like region 7A is provided. Also, in order to attain a stronger adhesion between the conductive ceramic fired body 10 and the glass plate 2 and ensure a good strength of the conductive ceramic fired body 10, it is preferred that the second light-shielding film 8 be disposed so as not to overlap with the conductive ceramic fired body 10.

The conductive ceramic fired body 10, the first light-shielding film 7 and the second light-shielding film 8 may be respectively subjected to calcination simultaneously with bending of each of the glass plate 2A and the glass plate 2B on which they are respectively provided. The bending of the respective glass plates may be conducted at the same time or separately from each other. The above procedure may be carried out in the following manner. That is, the two glass plates are respectively calcined, for example, at a temperature of 580° C. or higher, cooled and then laminated on each other through a release material, followed by subjecting the obtained laminate to bending.

Figure 8:
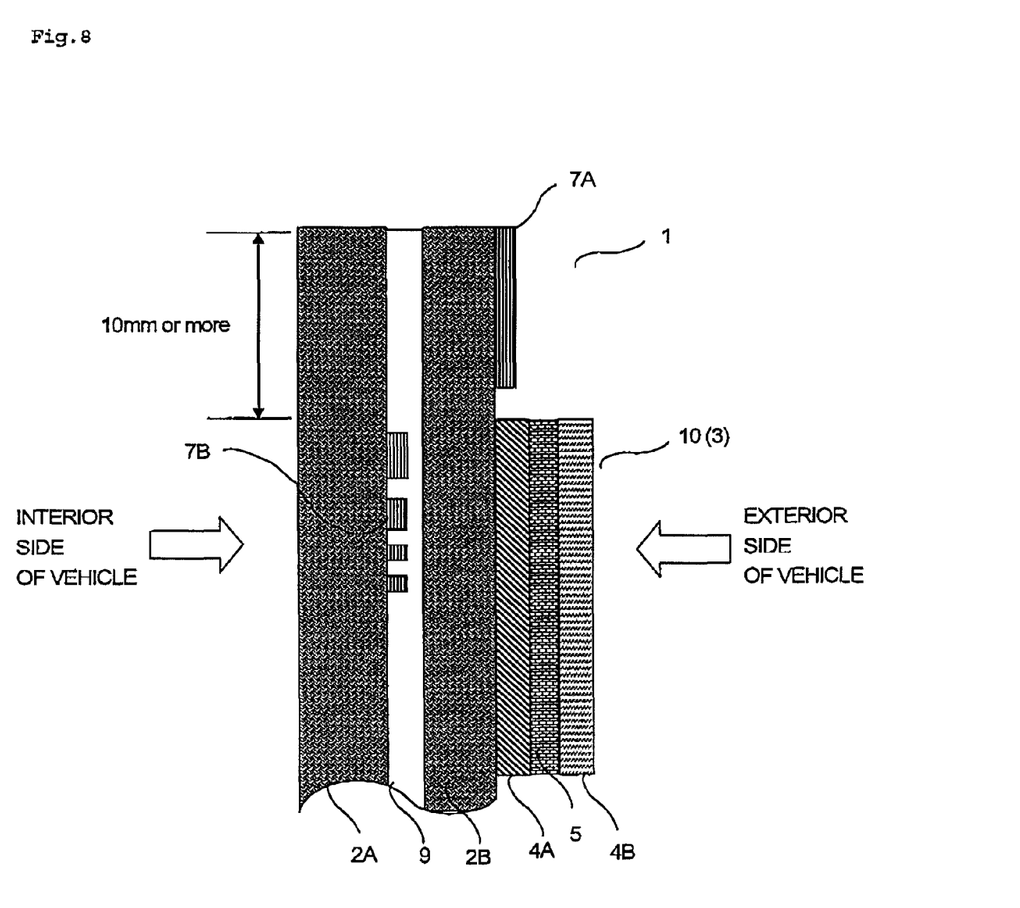
FIG. 8 is a sectional view of a preferred embodiment of a window glass for vehicles with conductive ceramic fired body according to the present invention.

[Embodiment of FIG. 8]

FIG. 8 is a vertical sectional view of a portion of the window glass 1 with conductive ceramic fired body where the linear portion 3 is formed. In the window glass 1 with conductive ceramic fired body as shown in FIG. 8, the glass plate 2 is in the form of a laminated glass including a glass plate 2A and a glass plate 2B which are bonded to each other through an intermediate film 9. The strip-like region 7A and the conductive ceramic fired body 10 are provided on an interior side surface of the glass plate 2B disposed on an interior side of the vehicle, whereas the dotted pattern region 7B is provided on an interior side surface of the glass plate 2A disposed on an exterior side of the vehicle.

In the above embodiment, the strip-like region 7A and the conductive ceramic fired body 10 may be disposed on an exterior side surface of the glass plate 2B. The dotted pattern region 7B is preferably disposed on the glass plate 2A to be spaced by at least 10 mm apart from a periphery of the glass plate 2A. With this arrangement of the embodiment, it is possible to calcine the dotted pattern region 7B simultaneously with calcination of the is conductive ceramic fired body 10 and the strip-like region 7A. More specifically, the glass plate 2A and the glass plate 2B can be subjected to bending at the same time, thereby desirably simplifying the process for production of the window glass.

Figure 9:
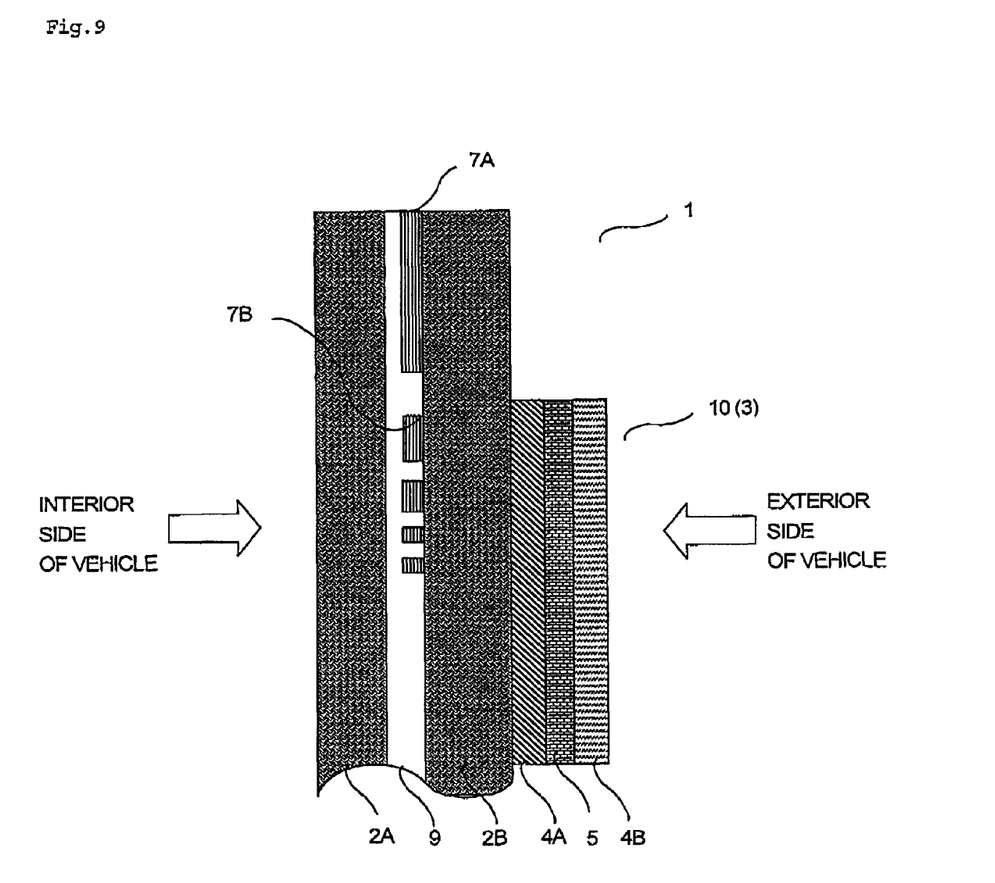
FIG. 9 is a sectional view of a preferred embodiment of a window glass for vehicles with conductive ceramic fired body according to the present invention.

[Embodiment of FIG. 9]

FIG. 9 is a vertical sectional view of a portion of the window glass 1 with conductive ceramic fired body where the linear portion 3 is formed. In the window glass 1 with conductive ceramic fired body as shown in FIG. 9, the glass plate 2 is in the form of a laminated glass including a glass plate 2A and a glass plate 2B which are bonded to each other through an intermediate film 9. The conductive ceramic fired body 10 is provided on an interior side surface of the glass plate 2B disposed on an interior side of the vehicle, whereas the first light-shielding film 7 having the strip-like region 7A and the dotted pattern region 7B is provided on an exterior side surface of the glass plate 2B disposed on an interior side of the vehicle. Alternatively, in this embodiment, the conductive ceramic fired body 10 may be disposed on an exterior side surface of the glass plate 2B, and the first light-shielding film 7 may be disposed on an interior side surface of the glass plate 2B.

Although the above embodiments are explained with respect to the cases where the window glass of the present invention is applied to vehicles, the present invention is not particularly limited to these embodiments. The present invention can also be applied to other window glasses such as window glasses for buildings and display window glasses.

EXAMPLES

The present invention is described in more detail by referring to the following Example. However, it should be noted that the following Example is only illustrative and not intended to limit the invention thereto.

[Evaluation Methods]

1. Evaluation of Resistance Value

Figure 10:
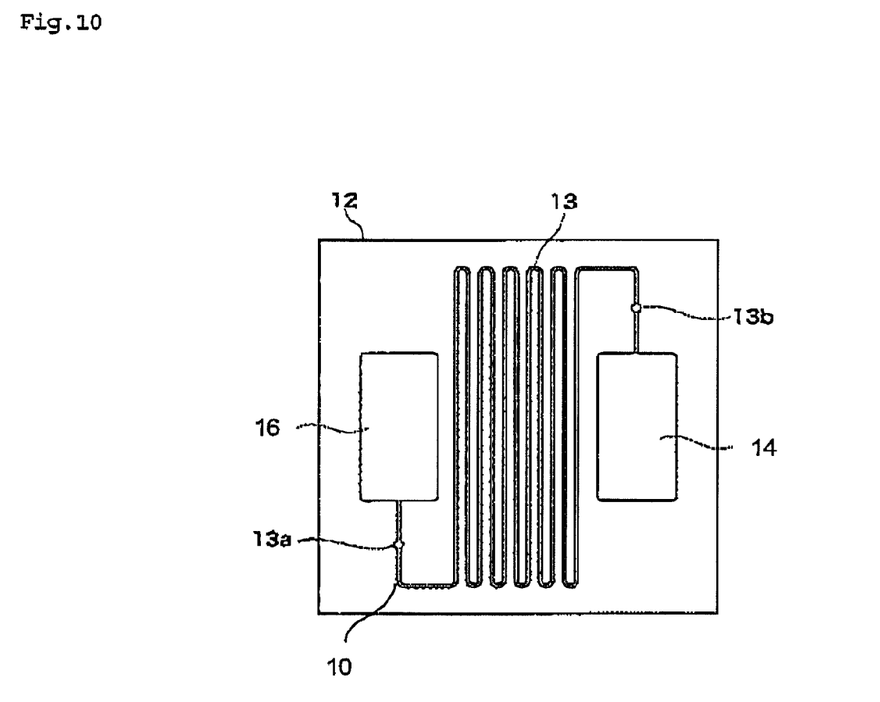
FIG. 10 is a front view of a window glass with conductive ceramic fired body which was obtained in Example 1.

In the window glass 12 with conductive ceramic fired body as shown in FIG. 10 which was obtained in Example 1, resistance values R (μΩ) were measured at resistance-measuring points 13a and 13b of a linear portion 13 (distance d between both the measuring points: 100 cm) using a digital multi-meter. In addition, the glass plate was cut across its portion including the linear portion 13 to measure a line width and a thickness of a conductor layer on its section by using a scanning electron microscope (SEM) and calculate a sectional area S ($cm^2$) of the conductor layer from these measured values. Then, the distance d between the measuring point 13a and 13b as well as the resistance values R and the sectional area S of the conductor layer as measured above were used to calculate a specific resistance ρ according to the formula: ρ=RS/d. The lower specific resistance ρ indicates a more excellent conductivity of the conductive ceramic fired body.

2. Evaluation of Color Tone

In the window glass 12 with conductive ceramic fired body which was obtained in Example 1, the measuring portion 14 thereof was observed from an interior side and an exterior side of the vehicle (the print surface side of the window glass and the rear surface side thereof opposed to the print surface) to measure the respective coordinate values in a 2-degree visual field XYZ color system according to JIS Z8701-1999, Hunter Lab color system and L*a*b* color system according to JIS Z8729-2004 by using a spectrophotometric colorimeter "CM-3500d (Model No.)" available from Konica-Minolta Holdings Corp., etc.

Example 1

The test pattern shown in FIG. 10 includes a conductive ceramic fired body 10 having a feeding point 16 and a linear portion 13, and a measuring portion 14 used for evaluating a color tone thereof. The linear portion 13 has measuring points 13a and 13b at which resistance values are to be measured (distance between both the measuring points: 100 cm; line width: 0.48 mm). Meanwhile, in the respective measuring points 13a and 13b, the conductor layer thereof is uncovered with the second colored layer and, therefore, kept in an exposed state. In addition, the feeding point 16 and the measuring portion 14 each have a length of about 40 mm and a width of about 20 mm.

In order to obtain the test pattern shown in FIG. 10, a first colored ceramic paste having a composition and a formulation as shown in Table 1 was screen-printed on one of main surfaces of the glass plate 12 having a thickness of 2.0 mm (float glass available from Nippon Sheet Glass Co., Ltd.) by using a screen capable of providing a printed layer having a line width of 0.48 mm in the linear portion 13 (polyester screen; 355 mesh; coating thickness: 20 μm; tension: 20 Nm; hardness of squeegee: 80 degrees; mounting angle: 75°; printing speed: 300 mm/s). The thus printed paste was dried at 150° C. for 10 min in a drying oven.

Next, a conductive ceramic paste having a composition and a formulation as shown in Table 2 was screen-printed on the thus printed first colored ceramic paste by using a screen capable of providing a printed layer having a line width of 0.36 mm, and then dried in a drying oven. Then, a second colored ceramic paste having a composition and a formulation as shown in Table 1 was screen-printed on the thus printed conductive ceramic paste such that a line width thereof was 0.43 mm, and then dried in a drying oven. At this time, the second colored ceramic paste was not printed on the portions forming the feeding point 16 and the resistance-measuring points 13a and 13b. The screen-printing conditions and drying conditions of the second colored ceramic paste were the same as those used above for the first colored ceramic paste.

Further, the resulting glass plate 12 was heated in a box oven maintained at 620° C. for 10 min and then cooled at a sufficiently slow cooling rate to obtain a glass with conductive ceramic fired body having no residual strain. The thus obtained glass was subjected to measurements for the width and thickness of the respective layers of the linear portion 13 using a scanning electron microscope (SEM) as well as evaluation for resistance values and color tones on both of the print surface of the glass on which the conductive ceramic fired body was formed and the rear surface of the glass opposed to the printed surface. The results are shown in Table 3.

TABLE 1

|  |  | First and second colored ceramic pastes |
|---|---|---|
| Pigment*[1] | mass % | 20 |
| Resin (cellulose resin) | mass % | 10 |
| Organic solvent (pine oil) | mass % | 10 |
| Glass binder*[2] | mass % | 65 |
| Viscosity | dPs | 150 |

Note
*[1]Main components: copper oxide, chromium oxide, iron oxide and manganese oxide
*[2]Main components: bismuth borosilicate, zinc borosilicate

TABLE 2

|  |  | Conductive ceramic paste |
|---|---|---|
| Silver particles (average particle size: 10 μm) | mass % | 70 |
| Glass binder*[1] | mass % | 10 |
| Resin (cellulose resin) | mass % | 5 |
| Organic medium (terpineol) | mass % | 15 |
| Viscosity | dPs | 180 |

Note
*[1]Main components: bismuth borosilicate, zinc borosilicate

TABLE 3

|  | Example 1 |
|---|---|
| First colored layer: line width (mm) | 0.48 |
| First colored layer: thickness (μm) | 4.5 |
| Second colored layer: line width (mm) | 0.43 |

TABLE 3-continued

| | Example 1 |
|---|---|
| Second colored layer: thickness (μm) | 4.5 |
| Conductor layer: line width (mm) | 0.36 |
| Conductor layer: thickness (μm) | 10.0 |
| Resistance value (Ω) | 17 |
| Specific resistance value (μΩcm) | 6.1 |
| Y (print surface/rear surface opposed to print surface) | 7.93/1.30 |
| X (print surface/rear surface opposed to print surface) | 7.64/1.23 |
| Z (print surface/rear surface opposed to print surface) | 9.60/0.32 |
| L (print surface/rear surface opposed to print surface) | 28.2/11.4 |
| a (print surface/rear surface opposed to print surface) | −0.89/−0.61 |
| b (print surface/rear surface opposed to print surface) | −0.47/6.31 |
| L* (print surface/rear surface opposed to print surface) | 33.9/11.3 |
| a* (print surface/rear surface opposed to print surface) | −1.30/−1.20 |
| b* (print surface/rear surface opposed to print surface) | −0.68/15.2 |

From the results shown in Table 3, it was confirmed that in the window glass with conductive ceramic fired body according to the present invention, the measuring portion 14 had such a black color as indicated by a psychometric lightness L* value of 50 or less when viewed from each of the print surface side of the window glass and the rear surface side thereof opposed to the print surface, and was therefore hardly noticeable from both of the print surface side and rear surface side of the window glass. In particular, the color of the measuring portion when viewed from the rear surface side opposed to the print surface was a dark black color indicated by a psychometric lightness L* value of 11.3. In addition, the conductive ceramic fired body had a specific resistance as low as 6.1 μΩcm, and it was therefore confirmed that the conductive ceramic fired body was excellent in conductivity.

INDUSTRIAL APPLICABILITY

In accordance with the present invention, it is possible to produce the window glass with conductive ceramic fired body which is capable of not only ensuring a good conductivity of the fired body but also exhibiting an improved appearance on both an interior side and an exterior side of a vehicle when the window glass is used for vehicles. Since the conductive ceramic fired body is applicable to antenna wires for receiving a variety of radio waves used in the applications such as digital broadcasting, televisions, radios, GPS and keyless entry systems, defoggers (hot wires), circuit wirings, etc., the window glass with conductive ceramic fired body according to the present invention can be suitably used, in particular, as a window glass for vehicles.

The invention claimed is:

1. A window glass with a conductive ceramic fired body, comprising at least one glass plate having first and second main surfaces and the conductive ceramic fired body comprising a feeding point and a linear portion which are disposed on the first or second main surface of the glass plate, the at least one glass plate having a light shielding film region where a light shielding film is provided and a visible region, which is a transparent portion of the glass plate where no light-shielding film is provided, at least a part of the linear portion of the conductive ceramic fired body being placed in the visible region and being formed by successively laminating a first colored layer, a conductor layer and a second colored layer on the first or second main surface of the glass plate, wherein the first colored layer and the second colored layer each comprise a pigment and a glass component, and the conductor layer comprises silver and a glass component.

2. The window glass with the conductive ceramic fired body according to claim 1, wherein the feeding point is formed by successively laminating the first colored layer and the conductor layer on the first or second main surface of the glass plate, and a portion of the linear portion which is disposed outside of the visible region is formed by successively laminating the first colored layer, the conductor layer and the second colored layer on the first or second main surface of the glass plate.

3. The window glass with the conductive ceramic fired body according to claim 1, wherein the conductor layer in the linear portion is covered with the first colored layer and the second colored layer.

4. The window glass with the conductive ceramic fired body according to claim 1, wherein the pigment in the first colored layer or the second colored layer contains at least one oxide selected from the group consisting of copper oxide, chromium oxide, iron oxide and manganese oxide.

5. The window glass with the conductive ceramic fired body according to claim 1, wherein the linear portion has a psychometric lightness L* value in CIE 1976 L*a*b* color system of 50 or less.

6. The window glass with the conductive ceramic fired body according to claim 5, wherein the linear portion has a color coordinate a* value in the L*a*b* color system of from −20 to 20, and a color coordinate b* value in the L*a*b* color system of from −20 to 20.

7. The window glass with the conductive ceramic fired body according to claim 1, wherein the conductor layer has a specific resistance of from 1 to 12 μΩcm.

8. The window glass with the conductive ceramic fired body according to claim 1, wherein the window glass is used for vehicles.

9. The window glass with the conductive ceramic fired body according to claim 1, wherein a line width of the linear portion is 1.0 mm or less.

10. The window glass with the conductive ceramic fired body according to claim 1, wherein the light-shielding film is arranged along at least a part of a peripheral portion of the glass plate.

11. A window glass comprising:
at least one glass plate having a first main surface and a second main surface;
a light-shielding film formed on a periphery of either the first main surface or the second main surface of the glass plate;
a conductive ceramic fired body comprising a feeding point and a linear portion, the feeding point and the linear portion being disposed on either the first main surface or the second main surface of the glass plate, the linear portion being a lamination of a conductor layer between a first colored layer and a second colored layer,
wherein at least a part of the linear portion is disposed on a transparent portion of the glass plate separate from the light-shielding film, and
wherein the first colored layer and the second colored layer each comprise a pigment and a glass component, and the conductor layer comprises silver and a glass component.

12. The window glass according to claim 11, wherein the feeding point is formed by successively laminating the first colored layer and the conductor layer on either the first main surface or the second main surface of the glass plate, and a portion of the linear portion which is disposed outside of the transparent portion is formed by successively laminating the first colored layer, the conductor layer and the second colored layer on either the first main surface or the second main surface of the glass plate.

13. The window glass according to claim 11, wherein the conductor layer in the linear portion is covered with the first colored layer and the second colored layer.

14. The window glass according to claim 11, wherein the pigment in the first colored layer or the second colored layer contains at least one oxide selected from the group consisting of copper oxide, chromium oxide, iron oxide and manganese oxide.

15. The window glass according to claim 11, wherein the linear portion has a psychometric lightness L* value in CIE 1976 L*a*b* color system of 50 or less.

16. The window glass according to claim 15, wherein the linear portion has a color coordinate a* value in the L*a*b* color system of from −20 to 20, and a color coordinate b* value in the L*a*b* color system of from −20 to 20.

17. The window glass according to claim 11, wherein the conductor layer has a specific resistance of from 1 to 12 μΩcm.

18. The window glass with according to claim 11, wherein the window glass is used for vehicles.

19. The window glass according to claim 11, wherein a line width of the linear portion is 1.0 mm or less.

* * * * *